May 29, 1956 A. R. RASMUSSEN 2,747,494
FIELD MARKER
Filed Sept. 17, 1951 2 Sheets-Sheet 1

Arnold R. Rasmussen
INVENTOR.

May 29, 1956  A. R. RASMUSSEN  2,747,494
FIELD MARKER
Filed Sept. 17, 1951  2 Sheets-Sheet 2

Arnold R. Rasmussen
INVENTOR.

United States Patent Office 2,747,494
Patented May 29, 1956

2,747,494

FIELD MARKER

Arnold R. Rasmussen, Sharon, N. Dak.

Application September 17, 1951, Serial No. 246,961

2 Claims. (Cl. 97—230)

This invention relates to a field marker and particularly to a marker for attachment to an agricultural implement.

In the operation of agricultural implements such as grain drills and seeders it is very desirable to have a mark left on the field so that each swath or traverse of the implement will be immediately adjacent to the preceding swath without "skips" or "laps."

Various methods have heretofore been utilized to make such a mark, but heretofore such markers have been inefficient or caused annoyance by interfering with the operation of the machine or with the previously treated ground.

The present invention provides a marker which is attached to the frame of the machine and operates at the edge of the swath and can be raised by a normal operation of the implement and automatically locked in inoperative position until released by the operator.

It is accordingly an object of this invention to provide an improved field marker.

It is a further object of the invention to provide a marker which can be conveniently mounted on an implement.

Another object of the invention is to provide a marker controlled by a normal operation of the implement.

Still another object of the invention is to provide a marker that can be locked in inoperative position or released at the will of the operator.

Other objects and many of the attendant advantages of this invention will be apparent from the following description taken in conjunction with the accompanying drawings in which:

Figure 5 is a perspective view of the lifting arm according to this invention.

Figure 1:
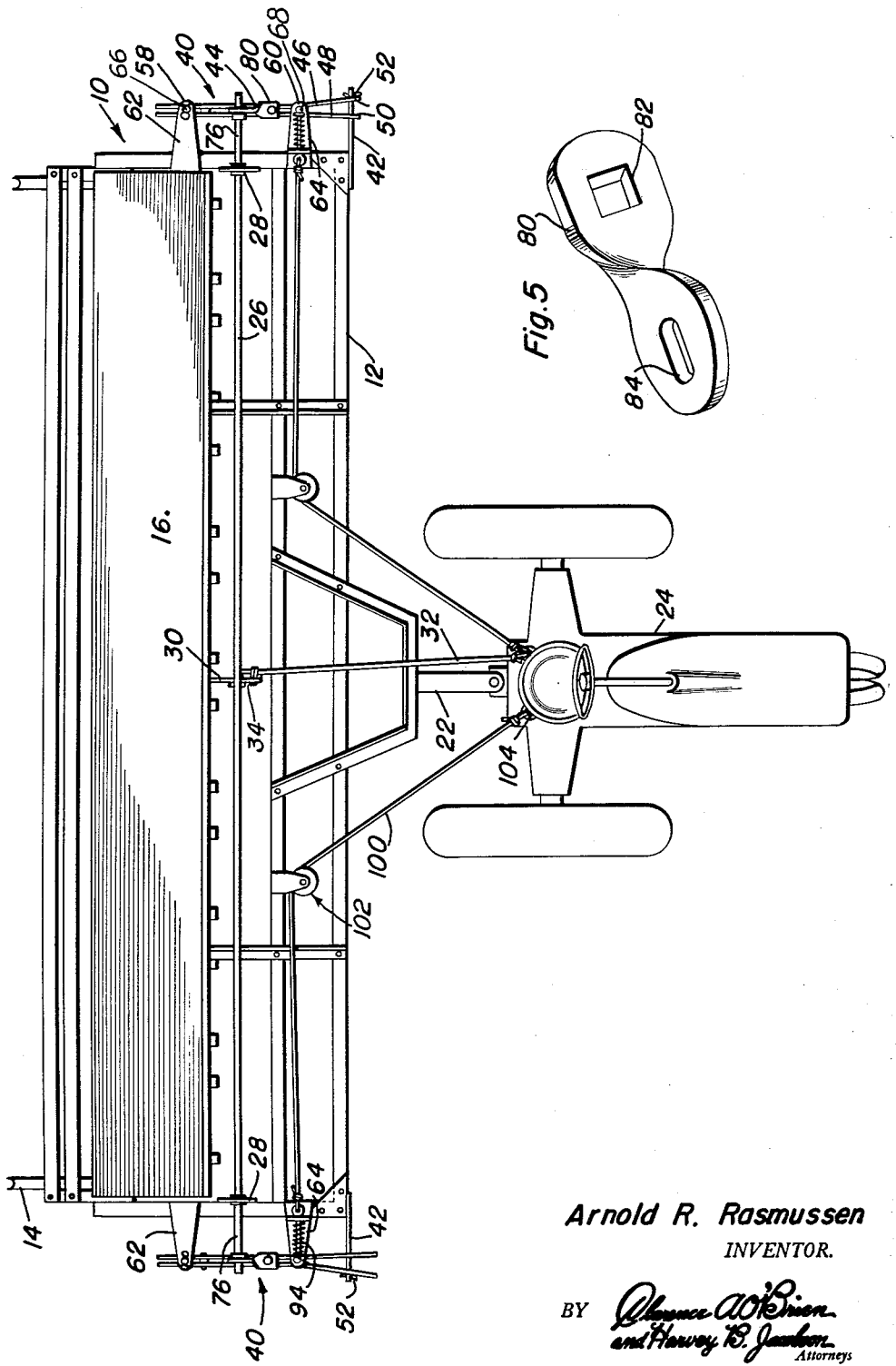
Figure 1 is top plan view of a grain drill with markers according to this invention.
Figure 2:
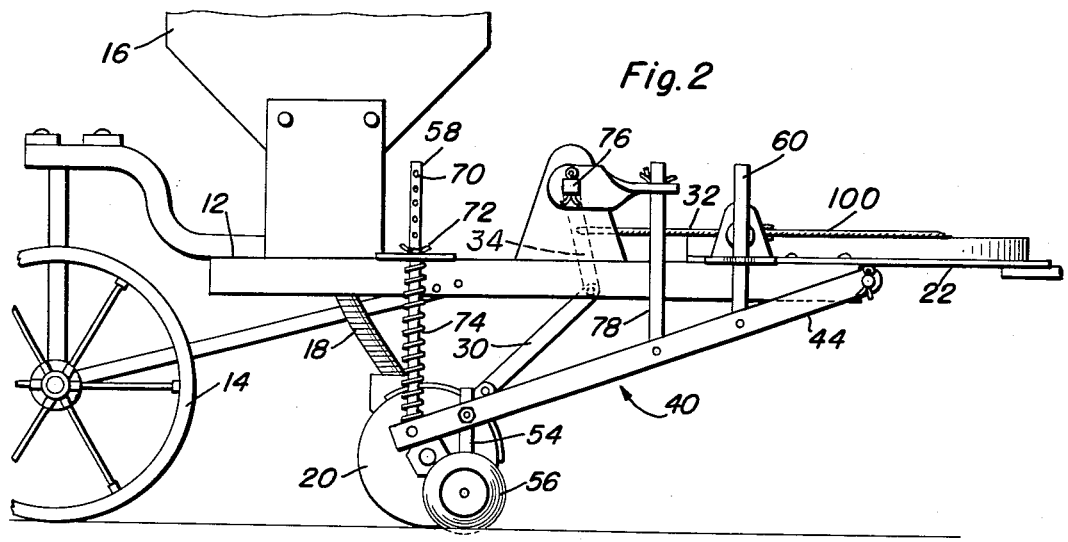
Figure 2 is an enlarged end view showing the marker in operative position.

In the exemplary embodiment according to this invention, the improved markers are shown attached to an agricultural implement 10, herein shown as a grain drill, having a frame 12 supported on wheels 14. Mounted on the frame 12 is a box or hopper 16 for containing seed and fertilizer as is well understood. A plurality of flexible tubes 18 extend from the dispensers (not shown) to earth working tools 20. The frame 12 is provided with a hitch 22 for attachment to a tractor 24 or other propelling device.

When transporting, or when maneuvering the implement 10 into operating position it is desirable to lift the earth working tools 20 and for this purpose a lifter bar 26 is journaled in a plurality of brackets 28 rigidly secured, as by welding, on the frame 12. Linkages 30 are provided between the lifter bar 26 and each of the earth working tools 20. An operating cable 32 is attached to a lever 34 rigidly mounted on lifter bar 26. The cable 32 may be operated in any desired manner but is usually connected to a power device such as a hydraulic cylinder (not shown) so that the earth working tools 20 may be lifted without excessive effort on the part of the operator.

The field markers indicated generally at 40 are attached to this standard implement 10 with the minimum of change of the original implement 10.

Auxiliary axle rods 42 are secured to the frame 12 in any desired manner and extend laterally from the frame 12 to a position outside the area worked by the earth working tools 20. Journaled on the axle rods 42 are markers arms 44, usually constructed of a pair of side bars 46 and 48 which are spread apart at the upper or front end so that the arms 44 are bifurcated. The bifurcated end of arms 44 are provided with holes 50 engaging the axle 42, the bifurcation providing a wide bearing angle so that the arms 44 will swing in a plane perpendicular to the axle 42 with the minimum of side play.

The arms 44 may be retained on the axles 42 by any suitable stops such as the pins 52. Rigidly attached to the free end of arm 44 is a marker support 54 and journaled on said support 54 is a marker tool in the form of a rotary plow 56 set to make a marking furrow when traversed over the field. In order to further control side sway of the arms 44, guide members, herein shown as two, 58 and 60 are pivotally attached to the arm 44. Guide means, such as plates 62 and 64, are secured to the frame 12 and extend over the arms 44 and are provided with openings 66 and 68 to loosely engage the guide members 58 and 60. If desired one of the guide members such as 58 may be provided with openings 70 in which a stop such as pin 72 may be inserted to limit the angle of swing of the arm 44. The weight of the marker is usually sufficient to force the marking tool 56 into the earth, but resilient means such as a spring 74 mounted on the rod 58 between the arm 44 and guide plate 62 may continuously urge the marker 40 toward the earth.

Figure 3:
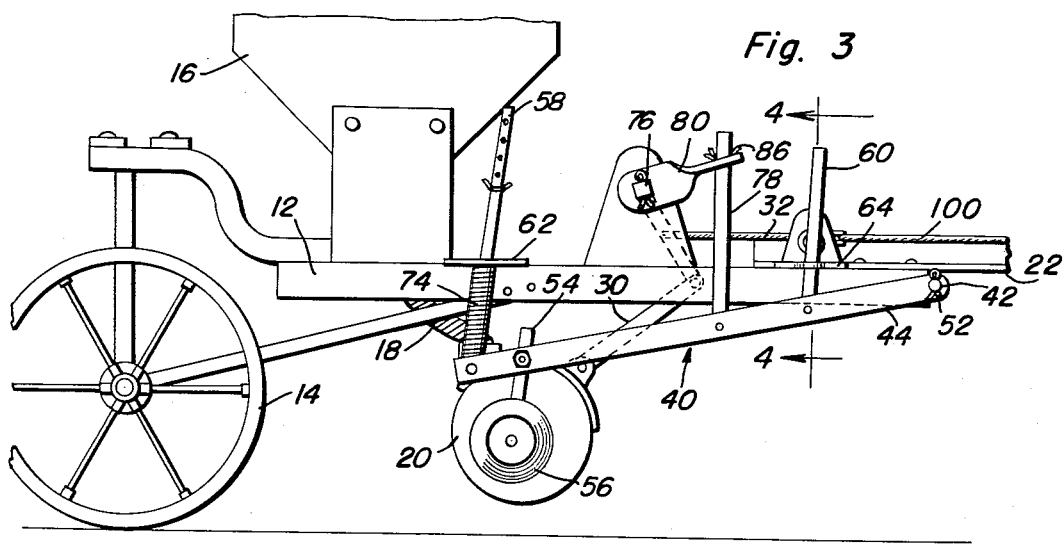
Figure 3 is a view similar to Figure 2 showing the drill shoes and the marker in retracted position.
Figure 4:
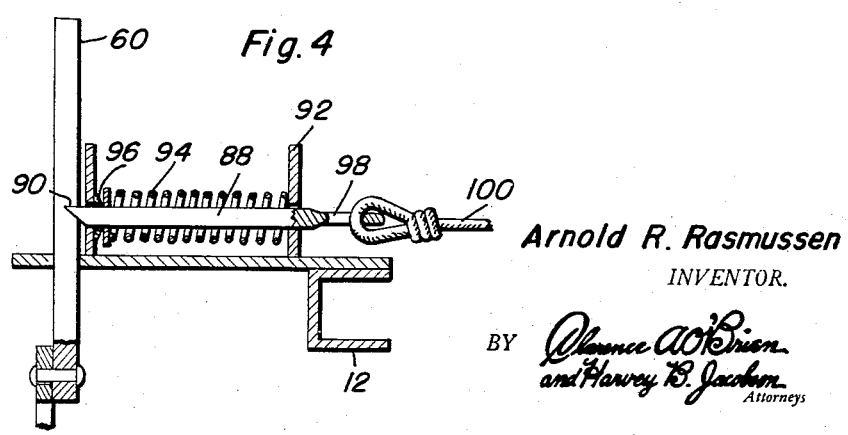
Figure 4 is an enlarged detail view of the latch taken on a plane substantially as indicated by the line 4—4 of Figure 3.

When transporting or maneuvering the implement it is desirable that the markers 40 be lifted out of earth engagement and for this purpose the lifter bar 26 has been extended as at 76 so as to overlie the markers 40. A lifting rod 78 is pivotally secured to the arm 44. An arm 80 is rigidly attached to the extension 76 in order to be actuated by rotation of lifter bar 26, the arm 80 may be of any desired shape or even be an angular extension of rod 76, but it is preferred to form the arm 80 as a flat plate having a square opening 82 for engagement with the rod 76 and a passage 84 for loosely engaging the lifting rod 78, the arm 80 being twisted intermediate the ends thereof so that opening 82 and passage 84 are at right angles to each other. The lifter rod 78 is provided with a stop such as pin 86 for engagement with the arm 80. The loose engagement of arm 80 with rod 78 allows selective actuation of the markers 40. When the lifter bar 26 is rotated to lift the tools 20 the extension 76 will cause arm 80 to swing with the extension 76 as a center. The arm 80 will engage the stop 86 (as shown in Fig. 3) and raise the arm 44, but on the reverse movement of lifter bar 26 the arm 80 may freely descend along rod 78 without exerting any pressure thereon.

In operation it is usually desired that only one marker 40 be in operation and the other be lifted so as not to disturb the already seeded ground. Latch means are therefore provided to latch the markers in inoperative position. The latching means includes a latch bar 88 slidably mounted in a bracket 92 on one of the guide plates such as 64. The latch bar 88 is resiliently urged toward the guide bar, such as 60, by spring 94 mounted on latch bar 88 and received between stop pin 96 and bracket 92, the guide bar 60 being provided with a notch 90 to receive the latch bar 88. The latch bar 88 is provided with an eye 98 to which is attached a rope 100 which passes through a pulley 102 and is attached to a suitable anchor 104 placed on the tractor 24 convenient to the operator's station.

In operation the lifter bar 26 will be actuated which will lift both markers 40 which will be latched in inoperative position until such time as the operator wishes to produce a mark, at which time the operator will pull one of the ropes 100 to unlatch the selected marker which will drop into contact with the earth unless the lifter bar 26 is in position to elevate the tools 20.

While for purpose of illustration a specific embodiment of the invention has been shown and described to the best of the present understanding thereof, it is understood that many changes and modifications can be made therein without departing from the true spirit of this invention.

Having described the invention, what is claimed as new is:

1. In an agricultural implement including a vehicular frame attachable to a draft vehicle, tool means pivotally supported within the confines of said frame, a rotatable lifter bar journalled transversely on said frame, linkage means extending between said tool means and lifter bar, said lifter bar including end portions extending laterally beyond side portions of said frame, and means operatively connected to said lifter bar for adjusting said tool means between an operative and inoperative position; a field marker attachment for defining a reference mark transversely of the vehicular frame, said field marker attachment including a marker arm, a forward end portion of said marker arm including means thereon for pivotally connecting said arm to a forward portion of the vehicular frame, an opposite end portion of said marker arm including a pivotally connected vertical first guide member extending upwardly through a first guide plate attachable in outward spaced relation to said vehicle frame, resilient means engageable between said marker arm and guide plate for urging said marker arm in a downward direction, a ground engaging marking tool dependingly supported on said marker arm on an intermediate portion thereof, an upwardly extending lift rod pivotally supported on an intermediate portion of said marker arm between the forward end portion thereof and said ground engaging marking tool, a lift arm including a portion containing a horizontal opening loosely receiving therethrough the lift rod, stop means included on an end portion of said lift rod extending through said lift arm, said stop means being engageable with an upper surface of said lift arm, said lift arm including a portion connectable to one end portion of the lift bar on said frame and rotatable therewith for raising and lowering said marking arm and marking tool in unison with said tool means on the frame, and lock means operatively connected to said marker arm for optionally restraining said marker arm in a raised position independently of the position of the tool means on said frame.

2. In a field marker attachment as set forth in claim 1 wherein said lock means includes a second vertical guide rod pivotally secured to said marker arm intermediate the lift rod and forward end portion of said marker arm, a second guide plate reciprocably receiving said second guide rod therein, a latch bar on said frame in intersecting relationship with said second guide rod, and means for urging said latch bar away from said second guide rod.

References Cited in the file of this patent

UNITED STATES PATENTS

| | | |
|---|---|---|
| 83,905 | Barto | Nov. 10, 1868 |
| 266,656 | Stoddard et al. | Oct. 31, 1882 |
| 315,260 | Downey | Apr. 7, 1885 |
| 411,342 | Leas | Sept. 17, 1889 |
| 417,944 | Reardon | Dec. 24, 1889 |
| 630,142 | Walkup | Aug. 1, 1899 |
| 672,476 | Edwards | Apr. 23, 1901 |
| 701,541 | Churchman | June 3, 1902 |
| 733,801 | Benton | July 14, 1903 |
| 914,843 | Jacobs | Mar. 9, 1909 |
| 989,725 | Rodgers | Apr. 18, 1911 |
| 1,144,274 | Winwood | June 22, 1915 |
| 1,264,153 | Burgess | Apr. 30, 1918 |
| 1,299,064 | Timmons | Apr. 1, 1919 |
| 2,010,110 | Scarlett | Aug. 6, 1935 |
| 2,063,852 | Ray | Dec. 8, 1936 |
| 2,613,586 | Boenig | Oct. 14, 1952 |
| 2,657,623 | Allen | Nov. 3, 1953 |
| 2,699,105 | Yerkes | Jan. 11, 1955 |

FOREIGN PATENTS

| | | |
|---|---|---|
| 4,513 | Great Britain | 1896 |
| 362,018 | Great Britain | Dec. 3, 1931 |